US010229582B2

(12) United States Patent
Cox et al.

(10) Patent No.: US 10,229,582 B2
(45) Date of Patent: *Mar. 12, 2019

(54) LOCATING A LOST DEVICE

(71) Applicant: INTERNATIONAL BUSINESS MACHINES CORPORATION, Armonk, NY (US)

(72) Inventors: Benjamin D. Cox, Winchester (GB); Daniel P. Craggs, Montreal (CA); Christopher J. Poole, Romsey (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/284,578

(22) Filed: Oct. 4, 2016

(65) Prior Publication Data

US 2017/0374515 A1    Dec. 28, 2017

Related U.S. Application Data

(63) Continuation of application No. 15/189,269, filed on Jun. 22, 2016.

(51) Int. Cl.
*G08B 1/08* (2006.01)
*G08B 21/24* (2006.01)
(Continued)

(52) U.S. Cl.
CPC .............. *G08B 21/24* (2013.01); *G01S 1/08* (2013.01); *G01S 5/0252* (2013.01);
(Continued)

(58) Field of Classification Search
CPC ....... H04W 4/02; H04W 4/023; H04W 4/008; H04W 4/028; H04W 4/206; H04W 92/18;
(Continued)

(56) References Cited

U.S. PATENT DOCUMENTS 9,699,612 B2 * 7/2017 Evans ................... H04W 4/023
2006/0193299 A1    8/2006 Winget et al.
(Continued)

FOREIGN PATENT DOCUMENTS

EP        2053573 A1    4/2009

OTHER PUBLICATIONS

Cox et al., "Power and Network Independent Locating of a Lost Device," U.S. Appl. No. 14/883,703, filed Oct. 15, 2015.
(Continued)

*Primary Examiner* — Daniel Previl
(74) *Attorney, Agent, or Firm* — Erik K. Johnson

(57) ABSTRACT

An embodiment of the invention may include a method, computer program product and computer system for detecting a device. The embodiment may include a computing device that determines a Universally Unique Identifier (UUID) of a beacon of a second device. The computing device may determine a first location of the first device. The computing device may determine whether the UUID of the beacon of the second device matches a UUID in a list of UUIDs, where each UUID in the list of UUIDs corresponds to a beacon associated with a device. The computing device may transmitting the UUID of the beacon of the second device and the first location to a third device, based on determining the UUID of the beacon of the second device matches an entry in the list.

7 Claims, 9 Drawing Sheets

(51) Int. Cl.
| | |
|---|---|
| *H04W 4/02* | (2018.01) |
| *G01S 5/02* | (2010.01) |
| *G01S 1/08* | (2006.01) |
| *H04B 17/318* | (2015.01) |
| *H04L 12/26* | (2006.01) |
| *H04L 29/08* | (2006.01) |
| *H04W 40/24* | (2009.01) |
| *G08B 13/14* | (2006.01) |
| *G08B 21/02* | (2006.01) |
| *H04W 12/12* | (2009.01) |
| *H04W 4/80* | (2018.01) |

(52) U.S. Cl.
CPC ..... *G08B 13/1427* (2013.01); *G08B 21/0227* (2013.01); *G08B 21/0272* (2013.01); *G08B 21/0277* (2013.01); *G08B 21/0286* (2013.01); *H04B 17/318* (2015.01); *H04L 43/0811* (2013.01); *H04L 43/16* (2013.01); *H04L 67/303* (2013.01); *H04W 4/02* (2013.01); *H04W 4/023* (2013.01); *H04W 4/80* (2018.02); *H04W 12/12* (2013.01); *H04W 40/244* (2013.01)

(58) Field of Classification Search
CPC ..... H04W 64/00; H04W 12/06; H04W 8/245; H04W 12/02; H04W 24/08; H04W 40/22; H04W 4/005; H04W 4/22; H04W 12/10; H04W 12/08; H04W 12/12; H04W 4/021; H04W 4/025; G06F 21/60; H04L 41/0233; H04L 41/0253; H04L 41/026; H04L 41/22; H04L 43/0811; H04L 63/14; H04L 67/00; A61M 2005/14
USPC ............ 340/539.32, 539.13, 539.21, 539.26, 340/568.1, 571, 572.1–572.9, 573.4, 340/691.6, 825.49
See application file for complete search history.

(56) References Cited

U.S. PATENT DOCUMENTS

| | | | |
|---|---|---|---|
| 2007/0185768 A1* | 8/2007 | Vengroff | G06Q 30/02 705/14.64 |
| 2013/0076523 A1* | 3/2013 | Kwan | A61B 5/0022 340/686.6 |
| 2014/0135042 A1 | 5/2014 | Buchheim et al. | |
| 2014/0191868 A1* | 7/2014 | Ortiz | H04W 12/12 340/539.13 |
| 2015/0005002 A1* | 1/2015 | Boulay | G01S 5/0072 455/456.1 |
| 2015/0371167 A1 | 12/2015 | Hall et al. | |
| 2016/0128049 A1 | 5/2016 | Phillips-Lubimiv et al. | |
| 2016/0157050 A1 | 6/2016 | He | |
| 2016/0381510 A1* | 12/2016 | Reynolds | H04W 4/026 455/456.1 |
| 2017/0124839 A1 | 5/2017 | Weissman | |

OTHER PUBLICATIONS

Pending U.S. Appl. No. 15/189,269, filed Jun. 22, 2016, entitled: "Locating a Lost Device", pp. 1-45.
Estimote, "How to extend Estimote Beacon battery life," Reality matters, The Estimote Team Blog, http://blog.estimote.com/post/83618039493/how-to-extend-estimote-beacon-battery-life, 6 pgs., Apr. 2014, printed Jun. 17, 2016.
Gigaom, "With iBeacon, Apple is going to dump on NFC and embrace the internet of things," https://gigaom.com/2013/09/10/with-ibeacon-apple-is-going-to-dump-on-nfc-and-embrace-the-internet-of-things/, 35 pgs., Sep. 10, 2013, printed Jun. 17, 2016.
Unknown, "We've Got Your Back," https://preyproject.com/, 7 pgs., printed Jun. 17, 2016.
Unknown, "Find My iPhone, iPad, iPod touch, or Mac," www.apple.com/support/icloud/find-my-iphone-ipad-ipod-mac/, 2 pgs., printed Jun. 17, 2016.
IBM: List of IBM Patents or Patent Applications Treated as Related (Appendix P), Oct. 7, 2016, pp. 1-2.

* cited by examiner

LOCATING A LOST DEVICE

BACKGROUND

The present invention relates generally to a method, system, and computer program product for locating a lost mobile device. More particularly, the present invention relates to a method, system, and computer program product for power and network independent locating of a lost device.

Users presently carry a variety of mobile devices with them. Some examples of mobile devices include mobile phones, tablet computers, and notebook or laptop data processing systems. Some mobile devices are wearable on the person of the user. Some examples of the wearable type of mobile devices take the form of smart watches, interactive eyewear, devices embedded in clothing or footwear, controllers wearable as rings, and pedometers.

SUMMARY

An embodiment of the invention may include a method, computer program product and computer system for detecting a device. The embodiment may include a computing device that determines a Universally Unique Identifier (UUID) of a beacon of a second device. The computing device may determine a first location of the first device. The computing device may determine whether the UUID of the beacon of the second device matches a UUID in a list of UUIDs, where each UUID in the list of UUIDs corresponds to a beacon associated with a device. The computing device may transmitting the UUID of the beacon of the second device and the first location to a third device, based on determining the UUID of the beacon of the second device matches an entry in the list.

DETAILED DESCRIPTION

Figure 1:
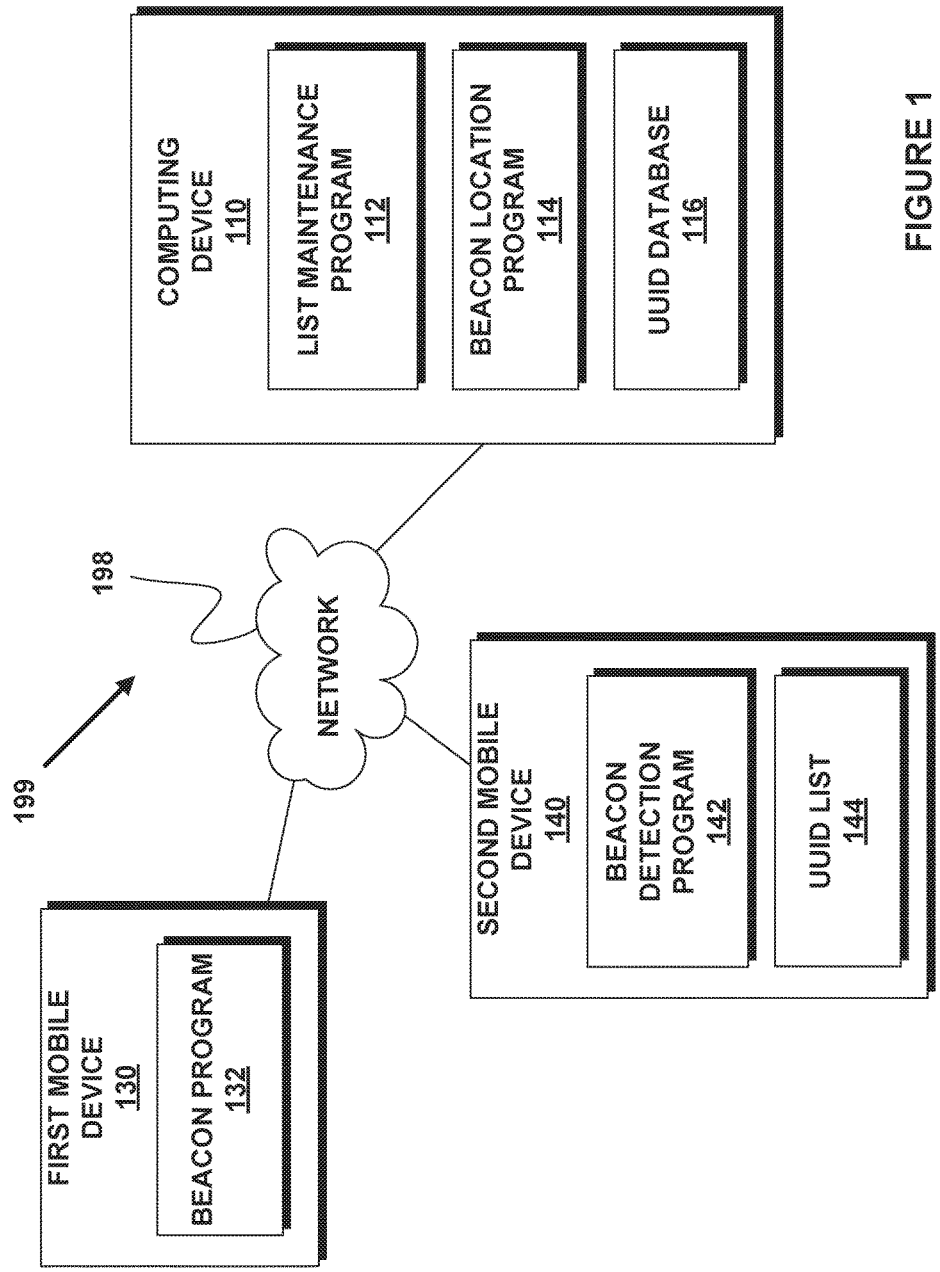
FIG. 1 illustrates a beacon detection system, in accordance with an embodiment of the invention.

Embodiments of the present invention will now be described in detail with reference to the accompanying Figures.

Losing a mobile device by a user is an unfortunate, yet all too frequent, occurrence. Some methods for finding a lost mobile device are presently available. For example, one presently available method sends a message or command to a lost device over a data network. If the device is communicating over the data network, the message causes the lost mobile device to transmit its own location over the data network, configures the device to operate in a restricted manner, or some combination thereof.

Another presently available method requires that the mobile device post its own location periodically to a server regardless of whether the device is lost. When the device is lost, the continued posting of the location helps locate the lost device.

The illustrative embodiments recognize that the presently available methods for locating a lost mobile device suffer from certain drawbacks. For example, the presently available methods require the lost device to have sufficient power in the main battery of the device, require the device to be able to communicate over a data network, or both.

The illustrative embodiments recognize that neither of these conditions can be assumed when a mobile device is lost. For example, when a lost device has remained powered on for a period after being lost, the charge of the battery of the device depletes and the device loses power as a result. Once the device power is lost, the device cannot communicate over any network, receive any commands, or perform any operations. When the device is truly lost, e.g., has fallen from the user's pocket under a park bench, the lack of power makes the device impossible to locate electronically, save a manual search by the user.

When a device is stolen, the malicious user may disconnect the device from all network communication, such as by putting the device in "airplane" mode, until they have reconfigured the device. The reconfigured device need not necessarily respond to the commands when the device reestablishes network communications.

In some cases, the device may be lost in a location where no data communication networks are available. Or, the device may eventually lose power at the location and all network communications cease. Thus, the illustrative embodiments recognize that requiring the device's power, communication abilities, or both, to remain available when the device is lost makes for an unreliable method for locating the lost device.

The illustrative embodiments used to describe the invention generally address and solve the above-described problems and other problems related to locating a lost mobile device. The illustrative embodiments provide a method, system, and computer program product for power and network independent locating of a lost device.

The illustrative embodiments recognize that low-power long range beacons are presently available (e.g. approximately 50 m and less). These beacons are electronic devices of very small form-factor, such as the size of a dime, which are self-contained with their own power source. When activated, such a beacon periodically broadcasts a small amount of data using a configured protocol. The broadcast can be received by other devices that are configured to receive such transmissions over that protocol.

The illustrative embodiments also recognize that some beacons can take the form of a radio frequency (RF) powered device, such as a Radio Frequency Identification (RFID) tag affixed to a vehicle passing through a toll-booth. When exposed to RF energy, such a device converts the RF energy into electrical power, and uses the electrical power to broadcast a small amount of data stored in the device's memory. Within the scope of the illustrative embodiments, a beacon can take the form of a self-contained powered device or a passive RF-powered device.

The illustrative embodiments described herein apply to mobile devices that include a beacon. Furthermore, within the scope of the illustrative embodiments, a beacon in a mobile device does not depend on the mobile device's battery as a power source, and does not depend on the mobile device's access to a data network to perform the broadcasts. The beacon of a lost device operates either on a self-contained power source built within the beacon, or by harnessing RF energy as described earlier.

Within the scope of the illustrative embodiments, a beacon is coupled with a mobile device in a substantially permanent manner, such that the beacon is not readily decoupled from the mobile device without some destruction of the mobile device, the beacon, or both. For example, within the scope of one embodiment, a beacon is configured in or with a mobile device in such a manner that the beacon cannot be disassociated from the mobile device without significantly disassembling the mobile device. For example, the beacon cannot be removed from the mobile device without opening the mobile device's case, accessing the mobile device's circuit board, and cutting a circuit in the mobile device's circuit board.

An embodiment is implemented in a mobile device that is lost. Hereinafter, a lost mobile device is referred to as a "lost device".

Another embodiment is implemented in another device that receives a broadcast of the beacon of the lost device. Such a device may be, but need not necessarily be, a mobile device. For example, a fixed receiver at a location may be able to pick-up a broadcast from the beacon of the lost device. Such other mobile and/or fixed devices are collectively referred to herein as a "proximate device(s)".

Another embodiment is implemented in a system of a data communication service provider. This service provider provides a data communication service to a proximate device. The service provider may be, but need not be, a service provider to the lost device as well. An operation of an embodiment does not depend upon the service provider providing a data communication service to the lost device.

One embodiment, which is implemented as an application in a lost device, activates the beacon in the lost device in response to detecting that the power availability at the device has depleted below a threshold level. Such an embodiment is useful when a presently available method for locating the device is also in use. The presently available method can operate to locate the lost device while the lost device has power, and the embodiment takes over in continuing the electronic locatability of the lost device in response to the lost device losing power or is about to lose power.

Another embodiment, which is implemented as an application in a lost device, activates the beacon in the lost device regardless of power availability at the lost device. Such an embodiment is useful when a presently available method for locating the lost device is either not available on the lost device, not configured on the lost device, disabled on the lost device, or cannot be relied upon for other reasons.

Another embodiment, which is implemented as an application in a proximate device, detects a broadcast from a beacon in a lost device. For example, suppose that the beacon of a lost device wirelessly broadcasts with sufficient power to reach proximate devices within fifty meters of the lost device. The beacon broadcasts an identifier associated with the lost device. The embodiment at a proximate device that is located close by, e.g., at a distance of five meters from the lost device, wirelessly detects a strong signal from the beacon, e.g., where the signal strength exceeds a threshold. The embodiment at a proximate device that is located far away, e.g., at a distance of forty five meters from the lost device, detects a weak signal from the beacon, e.g., where the signal strength is below the threshold.

Operating in this manner, the embodiment at the proximate device measures a signal strength of the beacon of the lost device and receives the identifier of the lost device. In one non-limiting example, the identifier is a Universally Unique IDentifier (UUID) associated with the lost device by a data processing system of a service provider of the lost device. Generally, the identifier broadcast from the beacon of a lost device is any suitable identifier using which a service provider, not limited to the lost device's service provider, which can identify the lost device and a user of the lost device.

The embodiment at the proximate device determines the proximate device's location. For example, the embodiment determines the proximate device's location by obtaining the Global Positioning System (GPS) coordinates from a GPS module in the proximate device. As another example, the embodiment determines the proximate device's location by trilateration, triangulation, or multi-angulation, using the Wi-Fi access points detected at or available to the proximate device. As another example, embodiment determines the proximate device's location by trilateration, triangulation, or multi-angulation, using the cellular base stations detected at or available to the proximate device.

The embodiment at the proximate device checks the identifier to a list of identifiers received from a service provider system to determine whether the mobile device associated with the identifier is a lost device. Different embodiments at the proximate device operate differently when the mobile device associated with the identifier is a lost device.

If the mobile device associated with the identifier is a lost device, one example embodiment executing at the proximate device sends the signal strength measurement and the proximate device's location to the proximate device's service provider system. As the proximate device moves relative to the lost device, such an embodiment may send to the proximate device's service provider system, one or more measurements of the signal strength together with one or more corresponding locations of the proximate device. Each or some of these communications from the proximate device to the service provider's system can include the identifier broadcast by the beacon.

If the mobile device associated with the identifier is a lost device, another example embodiment executing at the proximate device saves the signal strength measurement and the proximate device's location at time T1. As the proximate device moves relative to the lost device, such an embodiment makes another measurement of the signal strength together with a corresponding location of the proximate device at time T2. In this manner, the example embodiment makes three or more measurements and location determinations.

By trilateration, triangulation, or multi-angulation, on the three or more signal strength measurements and the corresponding locations of the proximate device, the example embodiment executing at the proximate device computes a location of the lost device. The example embodiment sends the computed location of the lost device to the proximate device's service provider system. This communication from the proximate device to the service provider's system can also include the identifier broadcast by the beacon.

Another embodiment executes at a system of the proximate device's service provider. This embodiment at the service provider's system receives the communications from the embodiment at the proximate device. In one case, as described above, an embodiment at the proximate device sends one or more measurements of the signal strength of the beacon, one or more corresponding locations of the proximate device when those signal strengths were measured, and optionally the identifier transmitted by the beacon. In such a case, the embodiment at the service provider's system collects such one or more communications from one or more proximate devices that are able to receive the lost device's beacon broadcast. The embodiment at the service provider's system performs trilateration, triangulation, or multi-angulation, on three or more signal strength measurements and the corresponding locations of the one or more proximate devices, and computes a location of the lost device.

In another case, as described above an embodiment at the proximate device computes the location of the lost device and sends that computed location to the service provider's system. In such a case, the embodiment at the service provider's system receives the computed location of the lost device.

In either case, in response to the embodiment at the service provider's system having the location of the lost device, the embodiment identifies a user associated with the lost device. For example, one embodiment determines that the identified lost device is serviced by the service provider of the proximate device, and therefore, the service provider's system has the information of the user of the lost device. The embodiment selects the information of the user and notifies the user about the location of the lost device.

Another embodiment determines that the identified lost device is serviced by a service provider other than the service provider of the proximate device. Therefore, the embodiment at the service provider's system passes location of the lost device and the identifier of the lost device to the other service provider's system through a back-channel communication between service providers. The other service provider's system notifies the user about the location of the user's lost device.

A method of an embodiment described herein, when implemented to execute on a device or data processing system, comprises substantial advancement of the functionality of that device or data processing system in locating a lost device. For example, a known method of locating a lost mobile device relies upon the availability of power, data communication capabilities, or both, while the device remains lost in order to locate the lost device. An embodiment uses a low-power beacon with a separate power source to broadcast an identifier of the device when the device is lost. The low-power mode is so configured at the beacon that the separate power source can last for many days, weeks, months, or even longer. In some cases the beacon can operate whenever the beacon is exposed to RF energy. The transmission of the beacon is not reliant upon the power source of the lost device, or the communication capabilities of the lost device. Such a manner of power and network independent locating of a lost device is unavailable in presently available devices or data processing systems. Thus, a substantial advancement of such devices or data processing systems by executing a method of an embodiment is in making a lost device locatable even when the power and the communication capabilities of the lost device are unusable at the lost device.

The illustrative embodiments are described with respect to certain beacons, protocols, methods of transmissions, identifiers, location information, signal strength measurements, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

FIG. 1 illustrates device location system 199, in accordance with an embodiment of the invention. In an example embodiment, device location system 199 includes a computing device 110, a first mobile device 130, and a second mobile device 140 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the computing device 110 and the first mobile device 130.

First mobile device 130 may include a beacon program 132. First mobile device 130 may be a notebook, a laptop computer, a tablet computer, a handheld device, a smartphone, or any other electronic device or computing system capable transmitting data to and from other computing devices such as second mobile device 140 via network 198, specifically via direct wireless signals. In a preferred embodiment, first mobile device 130 contains a beacon, as described above, which broadcasts a signal containing and identifier, such as a universally unique identifier, or UUID, to proximate devices. In an example embodiment, the beacon may broadcast signals using a Bluetooth® low energy device, such as an iBeacon™ (Bluetooth is a registered trademark of Bluetooth SIG, Inc; iBeacon is a trademark of Apple). In an example embodiment, first mobile device 130 represents a lost device. First mobile device 130 is described in more detail with reference to FIG. 3.

Beacon program 132 is a software application or configuration in a software application capable of initiating the beacon on the first mobile device 130. The initiation of the beacon on the first mobile device may be the result of low power (or battery life) of the first mobile device, or in instances where network signal is lost. The operations and functions of beacon program 132 are described in further detail below with regard to FIG. 2.

Second mobile device 140 may include a beacon detection program 142 and UUID list 144. Second mobile device 140 may be a notebook, a laptop computer, a tablet computer, a handheld device, a smart-phone, or any other electronic device or computing system capable transmitting data to and from other computing devices such as computing device 110 via network 198, and detecting a wireless signal from first mobile device 140. In a preferred embodiment, second mobile device 140 contains a mechanism for detecting wireless signals, such as those emanating from a beacon on a mobile device. In an example embodiment, second mobile device 140 represents a proximate device. Second mobile device 140 is described in more detail with reference to FIG. 3.

Beacon detection program 142 is a software application or configuration in a software application capable of detecting and determining a beacon signal is from a lost device. Beacon detection program 142 may intermittently receive updates of devices in the area (e.g. UUID list 144), in order to determine whether a device is a lost device. Further, beacon detection program 142 may notify computing device 110 of the location where a lost device is detected. The operations and functions of beacon detection program 142 are described in further detail below with regard to FIG. 2.

UUID list 144 is a list of unique identifiers relating to lost devices that has been distributed to the second mobile device 140. The list may be organized, or selected, based on the geographic location of the second mobile device 140.

Computing device 110 includes list maintenance program 112, beacon location program 114 and UUID database 116. Computing device 110 may be a desktop computer, a notebook, a laptop computer, a tablet computer, a handheld device, a smart-phone, a thin client, or any other electronic device or computing system capable of receiving and sending data to and from other computing devices such as second mobile device 140 via network 198. Although not shown, optionally, computing device 110 can comprise a cluster of web servers executing the same software to collectively process the requests for the web pages as distributed by a front end server and a load balancer. Computing device 110 is described in more detail with reference to FIG. 3.

In the example embodiment, UUID database 116 may contain UUIDs for lost mobile devices, such as first mobile device 130. UUID database 116 may also contain additional information related to each specific UUID such as, for example, possible locations the device was lost, locations where the device has been detected, times when the device has been detected and/or other relevant characteristics that may allow for granularization of the data into geographic subsets. UUID database 116 are described in further detail below with regard to FIG. 2.

List maintenance program 112 is a software application or configuration in a software application capable of receiving information from second mobile device 140, and transmitting an update to UUID list 144. List maintenance program 112 may determine when the UUID list 144 is out of date, and may update the UUID list 144 as appropriate. This may be optimized to reduce the data transmission across network 198. The operations and functions of list maintenance program 112 are described in further detail below with regard to FIG. 2.

Beacon location program 114 is a software application or configuration in a software application capable of receiving information from beacon detection program 142, and alerting a user when their lost device is detected. Beacon location program 114 may either receive a location of a device with a specific UUID, or alternatively may calculate the location of a lost device based on the location of the second mobile device 140, beacon signal strength, and other appropriate factors. The operations and functions of beacon location program 114 are described in further detail below with regard to FIG. 2.

Figure 3:
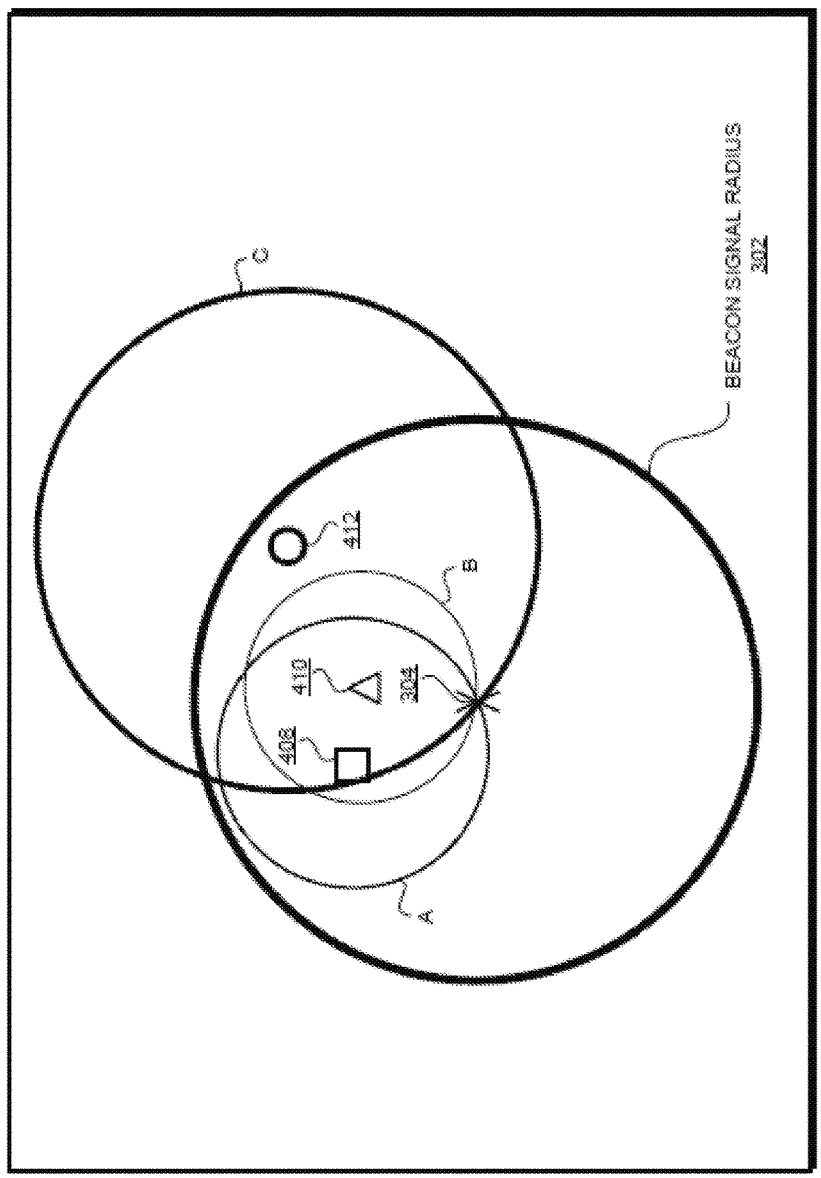
FIG. 3 illustrates a second example method of triangulation of a beacon, in accordance with an embodiment of the invention.

With reference to FIG. 3, this figure depicts an example process of beacon-based detection of a lost device in accordance with an illustrative embodiment. Beacon signal radius 302 defines an area around location 304 of a beacon associated with a lost device, such as first mobile device 130 in FIG. 1. The process described in this figure is an example of trilateration method of locating the lost device. From this disclosure, those of ordinary skill in the art will be able to adapt an embodiment to perform triangulation or multi-angulation instead, and such adaptations are contemplated within the scope of the illustrative embodiments.

Assume that a proximate device, such as second mobile device 140 in FIG. 1 follows travel path 306 near the lost device. When the proximate device reaches point 308, the proximate device is located relative to the beacon of the lost device at a distance equal to the distance between points 308 and 304. When the proximate device detects the broadcast of the beacon from that distance, from the proximate device's point of view, the beacon can be located anywhere in area "A" as shown. The proximate device measures a signal strength of the broadcast as S1.

The signal strength has a known mathematical relationship with the distance between a transmitter and a receiver. For example, in some cases, but not necessarily, signal strength S1 is inversely proportional to the distance between points 308 and 304. In some other cases, a more complex mathematical expression described the relationship between the signal strength and the distance. Other signal strengths described herein are similarly related to and computable from the corresponding distances between a beacon and a proximate device.

Upon further traversal, the proximate device reaches point 310 and detects the broadcast from the beacon again. When the proximate device reaches point 310, the proximate device is located relative to the beacon of the lost device at a distance equal to the distance between points 310 and 304. When the proximate device detects the broadcast of the beacon from that distance, from the proximate device's point of view, the beacon can be located anywhere in area "B" as shown. The proximate device measures a signal strength of the broadcast as S2.

As shown, point 310 is closer to the beacon therefore signal strength S2 will be stronger than signal strength S1. Given only the two measurements, the lost device can be located at any of the two intersections of areas A and B and the location of the lost device is therefore still uncertain.

Upon further traversal, the proximate device reaches point 312 and detects the broadcast from the beacon again. When the proximate device reaches point 312, the proximate device is located relative to the beacon of the lost device at a distance equal to the distance between points 312 and 304. When the proximate device detects the broadcast of the beacon from that distance, from the proximate device's point of view, the beacon can be located anywhere in area "C" as shown. The proximate device measures a signal strength of the broadcast as S3.

As shown, point 312 is farther from the beacon as compared to point 310; therefore, signal strength S3 will be weaker than signal strength S2. Given the three measurements, the lost device has to be located at the intersection of areas A, B, and C, and the location of the lost device is therefore established with certainty at location 304. More traversals and measurements can help disambiguate rare ambiguous situations even with three measurements, improve a precision with which the location 304 can be established, or some combination thereof.

Beacon detection program 142 implements an embodiment that operates in a proximate device, such as in the proximate device traversing path 306. When beacon detection program 142 implements one embodiment described herein, beacon detection program 142 sends to list location program 114 at computing device 110 in FIG. 1, locations 308, 310, and 312 of the proximate device along with the corresponding signal strength measurements of the beacon transmissions. List location program 114 computes location 304 from locations 308, 310, and 312, and the signal strengths S1, S2, and S3.

When beacon detection program 142 implements another embodiment described herein, beacon detection program 142 computes location 304 from locations 308, 310, and 312, and the signal strengths S1, S2, and S3. Beacon detection program 142 then sends to list location program 114 at computing device 110, computed location 304 of the lost device.

With reference to FIG. 3, this figure depicts another example process of beacon-based detection of a lost device in accordance with an illustrative embodiment. Beacon signal radius 302 defines an area around location 304 of a beacon associated with a lost device, such as of beacon 146 of first mobile device 130 in FIG. 1. The process described in this figure is an example of trilateration method of locating the lost device. From this disclosure, those of ordinary skill in the art will be able to adapt an embodiment to perform triangulation or multi-angulation instead, and such adaptations are contemplated within the scope of the illustrative embodiments.

Assume that one proximate device, such as second mobile device 140 in FIG. 1 is located at point 408, relative to the beacon of the lost device at a distance equal to the distance between points 408 and 304. The proximate device at point 408 detects the broadcast of the beacon from that distance, and from the proximate device's point of view, the beacon can be located anywhere in area "A" as shown. The first proximate device at point 408 measures a signal strength of the broadcast as S1.

Another proximate device is located at point 410 and detects the broadcast from the beacon. Based on the detection by the second proximate device at point 410, the beacon can be located anywhere in area "B" as shown. The second proximate device at point 410 measures a signal strength of the broadcast as S2.

Similarly, another proximate device is located at point 412 and detects the broadcast from the beacon. Based on the detection by the third proximate device at point 412, the beacon can be located anywhere in area "C" as shown. The third proximate device at point 412 measures a signal strength of the broadcast as S3.

Assume that each of the three proximate devices is operating beacon detection program 142. Beacon detection program 142 of the first proximate device sends to list location program 114 location 408 and signal strength S1. Beacon detection program 142 of the second proximate device sends to list location program 114 location 410 and signal strength S2. Beacon detection program 142 of the third proximate device sends to list location program 114 location 412 and signal strength S3. Using the communications from the three proximate devices or more in a similar manner, list location program 114 computes location 304 from locations 408, 410, and 412, and the signal strengths S1, S2, and S3.

Figure 2:
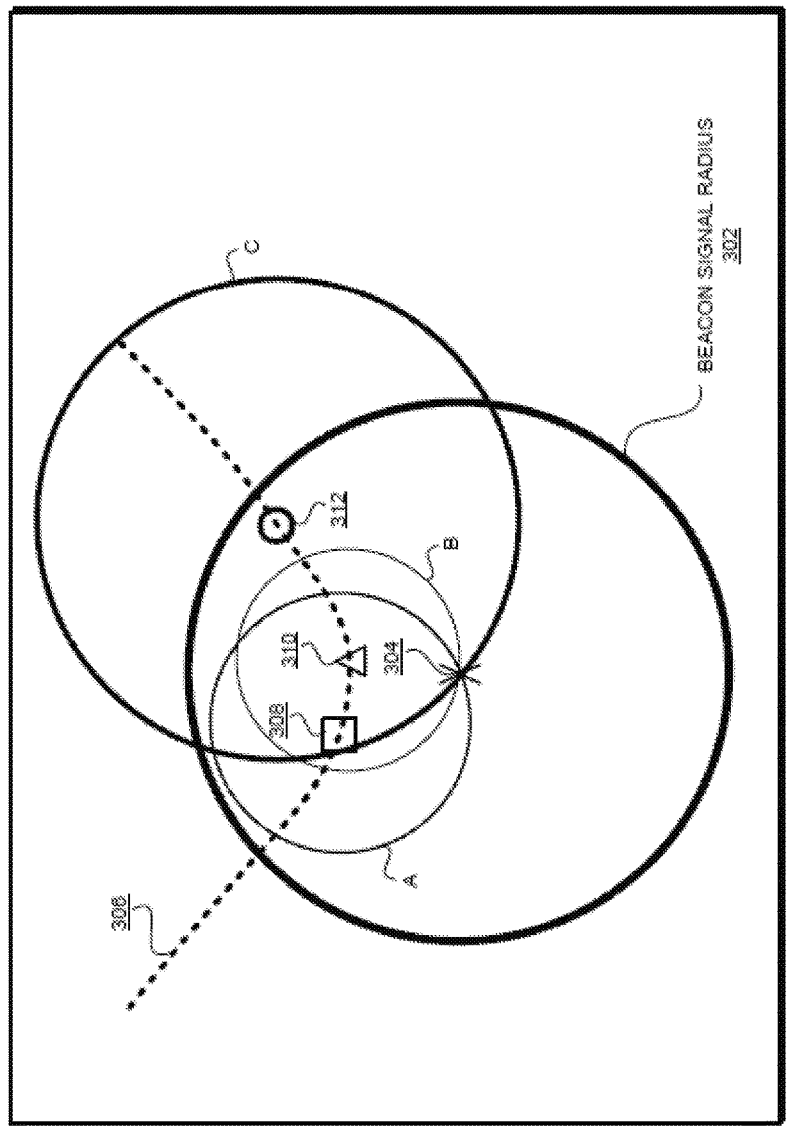
FIG. 2 illustrates a first example method of triangulation of a beacon, in accordance with an embodiment of the invention.

Various embodiments, such as those described with respect to FIGS. 2 and 3, cause a proximate device to detect a beacon broadcast and perform a transmission to the proximate device's service provider system. In some cases, when a proximate device detects a beacon transmission from a lost device, the proximate device may itself not have data connectivity to the proximate device's service provider system. Under such circumstances, an embodiment causes the proximate device to save the identifier from the beacon and the proximate device's own location, and causes the proximate device to perform the transmission as described herein at a later time in response to data connectivity to the proximate device's service provider system being restored.

Figure 4:
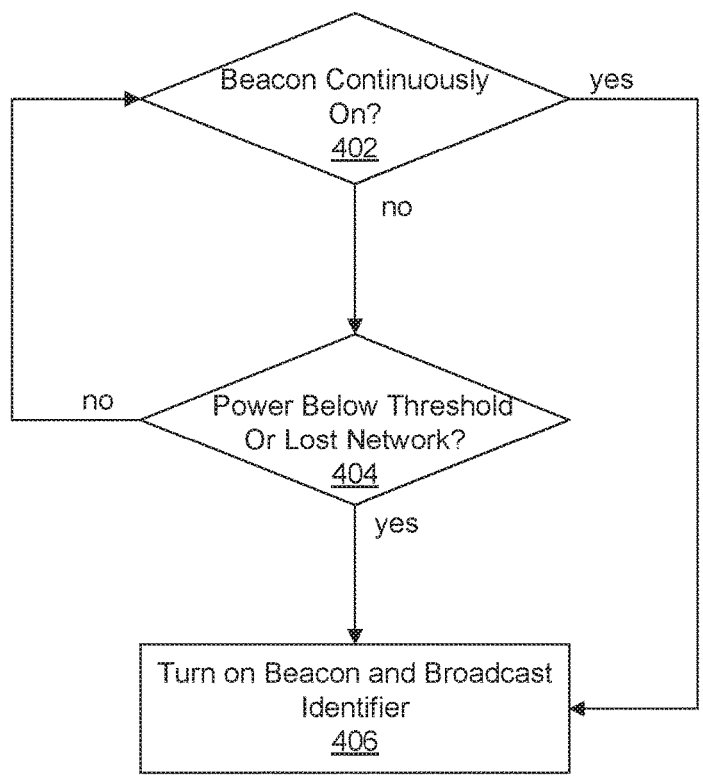
FIG. 4 is a flowchart illustrating the operations of the beacon program of FIG. 1, in accordance with an embodiment of the invention.

With reference to FIG. 4, this figure depicts a flowchart of an example embodiment of a process for operating a beacon on a lost device, such as first mobile device 130, in accordance with beacon program 132.

Referring to step 402, the beacon program 132 determines whether the operation of the beacon of the lost device is constant/continuous. The determination may be based on device settings, which may be set during the manufacturing of the hardware, set when programming the operating system of the device, or selected by the user of the device. If the beacon program 132 is set to operate continuously, beacon program 132 proceeds to step 406. If the beacon program 132 is not set to operate continuously, beacon program 132 proceeds to step 404.

Referring to step 404, the beacon program 132 determines whether the power source of the lost device is below a threshold value, a connectivity to a data network has been lost, or both. The threshold value may be a set value, or may be determined based on the amount of power needed by the first mobile device 140 to communicate with the computing device 110 over network 198 for a set amount of time (e.g. 10 minutes). Network connectivity may be based on whether there is a sufficient signal strength for the first mobile device 140 to connect to the computing device 110, using a wireless network. If the power drops below a threshold value, or the network is lost, beacon program 132 proceeds to step 406. If the power drops below a threshold value, or the network is lost, beacon program 132 proceeds to step 402.

Referring to step 406, beacon program 132 turns the beacon on in the lost device, which in turn periodically broadcasts a signal. The broadcasted signal may contain an identifier containing a tag. The tag may be one of a known set of sequences that identifies the transmitting device as a beacon, or alternatively that the broadcasted signal is related to the signaling of a lost device. In an example embodiment, the tag may be a 4 character sequence located at the beginning of the UUID.

Figure 5A:
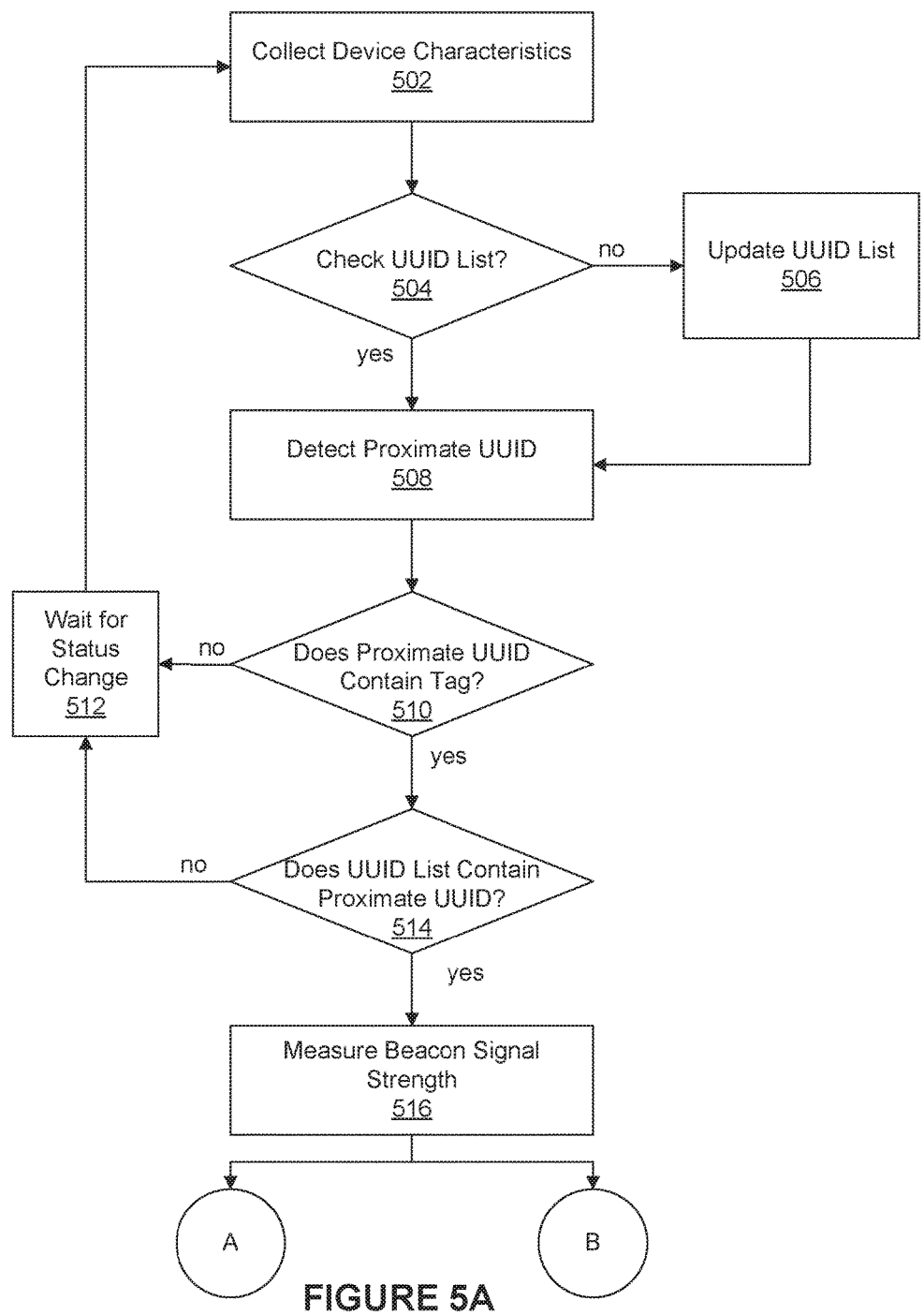
FIGS. 5a and 5b are a flowchart illustrating the operations of the beacon detection program of FIG. 1, in accordance with an embodiment of the invention.
Figure 5B:
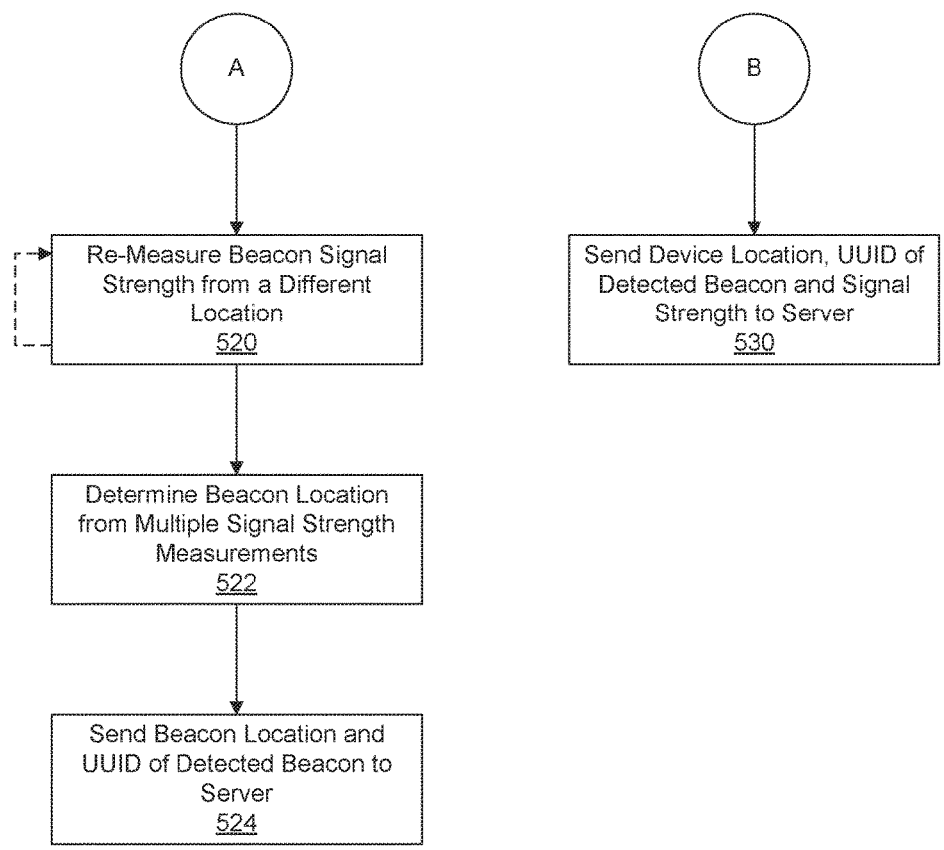

With reference to FIGS. 5A and 5B, these figures depict a flowchart for example embodiments of processes for detecting an operating beacon by a proximate device, such as second mobile device 140, in accordance with beacon detection program 142. For simplicity, FIGS. 5A and 5B depict 2 embodiments, with the divergence of the embodiments occurring following step 516, and labeled as path A and path B, for clarity.

Referring to step 502, beacon detection program 142 collects characteristics concerning the second mobile device 140. Characteristics of the device may represent information that allows for a tailoring of the UUID list 144 to locations that the second mobile device 140 is likely to be, and updating the UUID list 144 when devices are added, or removed, from the list. Characteristics of the device may be, for example, current location, prospective locations, last update request of the UUID list 144, last update request for each geographic region of the UUID list 144, or any other relevant information.

In an example embodiment, characteristics of the device may determine a prospective location of the device. The prospective location of the device may be a determination of which geographic locations the prospective device is likely to be for a predetermined amount of time, such as until the next update is scheduled to occur. The determination may use predictive modeling based on a user's previous actions or movements, as well as any specific entered information (e.g. calendared events).

Referring to step 504, beacon detection program 142 determines if the UUID list 144 should be updated based on the current device characteristics. The UUID may not be current in instances where the device characteristics do not match the parameters of the UUID list(s), or when a sufficient amount of time has passed since the last update. In an example embodiment, the UUID list 144 would not be current if the geographic region of the list is different from the current location of the second mobile device 140. In another embodiment, beacon detection program 142 may periodically check for updates on set intervals (e.g. once an hour). If the UUID list is current, beacon detection program 142 proceeds to step 508. If the UUID list is not current, beacon detection program 142 proceeds to step 506.

Referring to step 506, beacon detection program 142 sends a UUID update request to the computing device 110, and receives any available updates. The UUID update request may contain any information detailing the current UUID list 144 such as, for example, the geographic regions contained in the current UUID list 144, the last time the UUID list 144 was updated (or an update was requested), etc. Following transmitting of the update request, the second mobile device receives any relevant updates to the UUID. In an example embodiment, UUID only receives UUIDs that have changed (or are to be removed), in order to reduce the data transmission across network 198. In another embodiment, the entire relevant UUID list 144 is transmitted to the second device, and the replaces the UUID list 144 contained on the second device.

Referring to step 508, beacon detection program 142 detects any proximate wireless signals, and determines the UUID for the device. The UUID may be determined by converting the wireless signal to the representative digital data, and searching the data for the UUID associated with the device that transmitted the wireless signal.

In an alternative embodiment, steps 506 and 508 may be replaced with receiving a new UUID from a local device. In such an embodiment, a local device may be a mobile device (similar to first mobile device 130 and second mobile device 140), or may be a local server (similar to computing device 110). In such an embodiment, second mobile device 140 receives a wireless transmission from the local device that includes the new UUID, as well as any metadata associated with the new UUID (e.g. date, time, possible location). In such embodiments, the beacon detection program 142 receives the new UUID, and searches the UUID list 144 for the new UUID. If the new UUID is already contained in the UUID list 144, no changes to the list are made. If the new UUID is not in the list, the UUID list 144 is updated to include the new UUID. This alternative embodiment may be useful in instances where the second mobile device 140 is unable to connect to computing device 110, and the new UUID could be transmitted from local device with a connection to computing device 110, or a more recent update, or alternatively where the local device is a server for a specific location, with lost devices for that location.

Referring to step 510, beacon detection program 142 determines if the UUID from step 508 contains a tag relating to a beacon device. The tag may relate to a specific device type that transmitted the signal (e.g. beacon), where one or more tags may represent the relevant device. The beacon detection program 142 finds the tag from the portion of the received UUID containing the tag and compares the tag to one or more tags representing the relevant devices. If the tag is the matches the sequence, beacon detection program proceeds to step 514. If the tag does not match the sequence, beacon detection program 142 proceeds to step 512.

Referring to step 512, beacon detection program 142 does not perform any actions, and waits before returning to step 502. In one embodiment, beacon detection program 142 may wait a predetermined period of time before progressing to step 502. Additionally, or alternatively, beacon detection program may wait until the location of the second mobile device 140 changes before progressing to step 502.

Referring to step 514, beacon detection program 142 determines whether the identifier belongs to a lost device. Beacon detection program 142 compares the detected UUID to the UUIDs of lost devices in the UUID list 144. In some embodiments, in order to conserve energy or processing power, the detected UUID may only be compared to a UUID list for the relevant geographic area. If the detected UUID matches a UUID from the UUID list, beacon detection program proceeds to step 516. If the detected UUID does not match a UUID from the UUID list, beacon detection program 142 proceeds to step 512.

Referring to step 516, beacon detection program 142 measures the signal strength of the beacon transmission. The beacon detection program 142 may additionally convert the signal strength to a distance measurement, by referencing the measured signal strength to an algorithm or data table that has previously correlated the relationship between distance and signal strength, to determine the distance from the beacon.

Depending upon a configuration of the application, the application follows one of two possible paths of beacon detection program 142. In one path (illustrated as path B), the application sends the location from step 502, the signal strength from step 516, and the identifier from step 508, to the computing device 110 (step 530) in order for the computing device 110 to determine the beacon location. Beacon detection program 142 subsequently ends, or alternatively restarts the monitoring from step 502.

Referring to step 520 of the alternate path (illustrated as path A), beacon detection program 142 re-measures the signal strength from another location. In one embodiment, beacon detection program 142 initiates a time delay between measurements, in order to allow the second mobile device 140 to change position with respect to the beacon. In an example embodiment, beacon detection program 142 takes 3 or more measurements of the signal strength prior to progressing to step 522, however the number of measurements may be modified based on the desired specificity of the beacon location determination.

Referring to step 522, beacon detection program 142 performs trilateration, triangulation, or multi-angulation, depending upon the number of measurements and different locations from where the measurements are made, of the location of the beacon. Trilateration, triangulation, or multi-angulation may be performed based on the principles discussed in FIGS. 2 and 3.

Referring to step 524, beacon detection program 142 sends the calculated location of the beacon to the computing device 110. Additionally, beacon detection program 142 sends the UUID of the beacon to the computing device 110. In an optional embodiment, beacon detection program 142 may also send device location and signal strength to computing device 110, in order for computing device 110 to use information from more than one device to refine the calculated location of the beacon.

Note that while beacon detection program 142 is described with respect to a single lost device, a single beacon, and a single identifier, in some circumstances, the application may be able to receive multiple identifiers from multiple beacons operating in a crowded space. The application can verify, one by one, whether an identifier belongs to a lost device. Alternatively, the application can collect the received identifiers, send one batch detection with all the received identifiers, and relevant location information.

Figure 6:
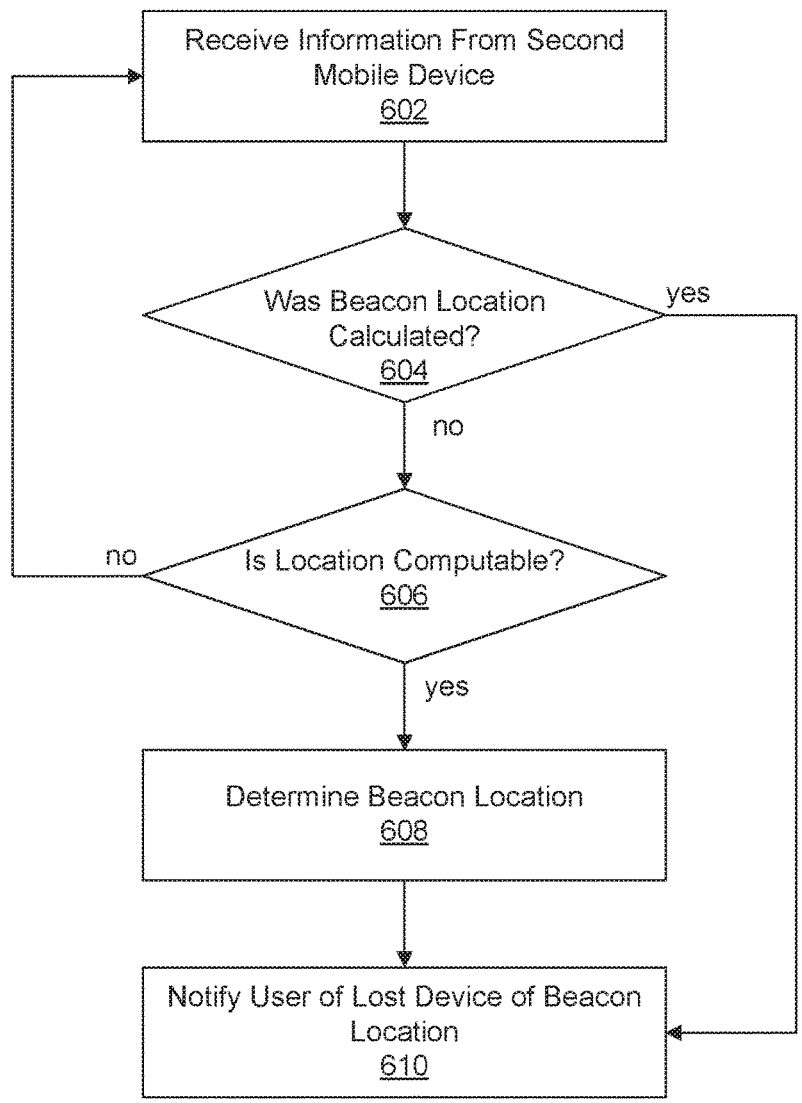
FIG. 6 is a flowchart illustrating the operations of the beacon location program of FIG. 1, in accordance with an embodiment of the invention.

With reference to FIG. 6, this figure depicts a flowchart for an example embodiment of a process for determining a location of an operating beacon and informing a user of the location of the lost device, such as first mobile device 130, in accordance with beacon location program 114.

Referring to step 602, beacon location program 114 receives beacon information from the second mobile device 140. The beacon information refers to, at least, a UUID of a lost beacon. Additionally, the beacon information may contain either: a location of the beacon determined by the second mobile device 140; or information that would allow the beacon location program 114 to determine the location of the beacon.

Referring to step 604, beacon location program 114 determines whether the location of the beacon was previously calculated. This determination may be made in instances where the second mobile device transmits the location of the beacon (e.g. path A of beacon detection program). If the location of the beacon has been determined, beacon location program 114 proceeds to step 610. If the location of the beacon has been determined, beacon location program 114 proceeds to step 606.

Referring to step 606, beacon location program 114 determines if there is sufficient information to compute a location of the beacon. If at least three locations of proximate device(s) and three signal strength measurements have not yet been received for an identifier, the beacon location program 114 returns to step 602 and waits for the same or different proximate device(s) to report additional locations and signal strengths from those locations. If the location of the lost device is computable, i.e., in response to at least three locations of proximate device(s) and three signal strength measurements being received for an identifier, the beacon location program 114 proceeds to step 608 to perform trilateration, triangulation, or multi-angulation to compute the location of the beacon.

Referring to step 608, beacon location program 114 determines the location of the beacon. The beacon location program 114 performs trilateration, triangulation, or multi-angulation, depending upon the number of measurements and different locations from where the measurements are made, of the location of the beacon. Trilateration, triangulation, or multi-angulation may be performed based on the principles discussed in FIGS. 2 and 3.

Referring to step 610, beacon location program 114, notifies a user of the lost device about the location of the lost device. Notification may be an audio, visual or textual message sent to a third device associated with the user of the lost device, or to one or more messaging accounts associated with the user of the lost device. For example, notification may be an e-mail to an e-mail account of the user of the lost device.

Figure 7:
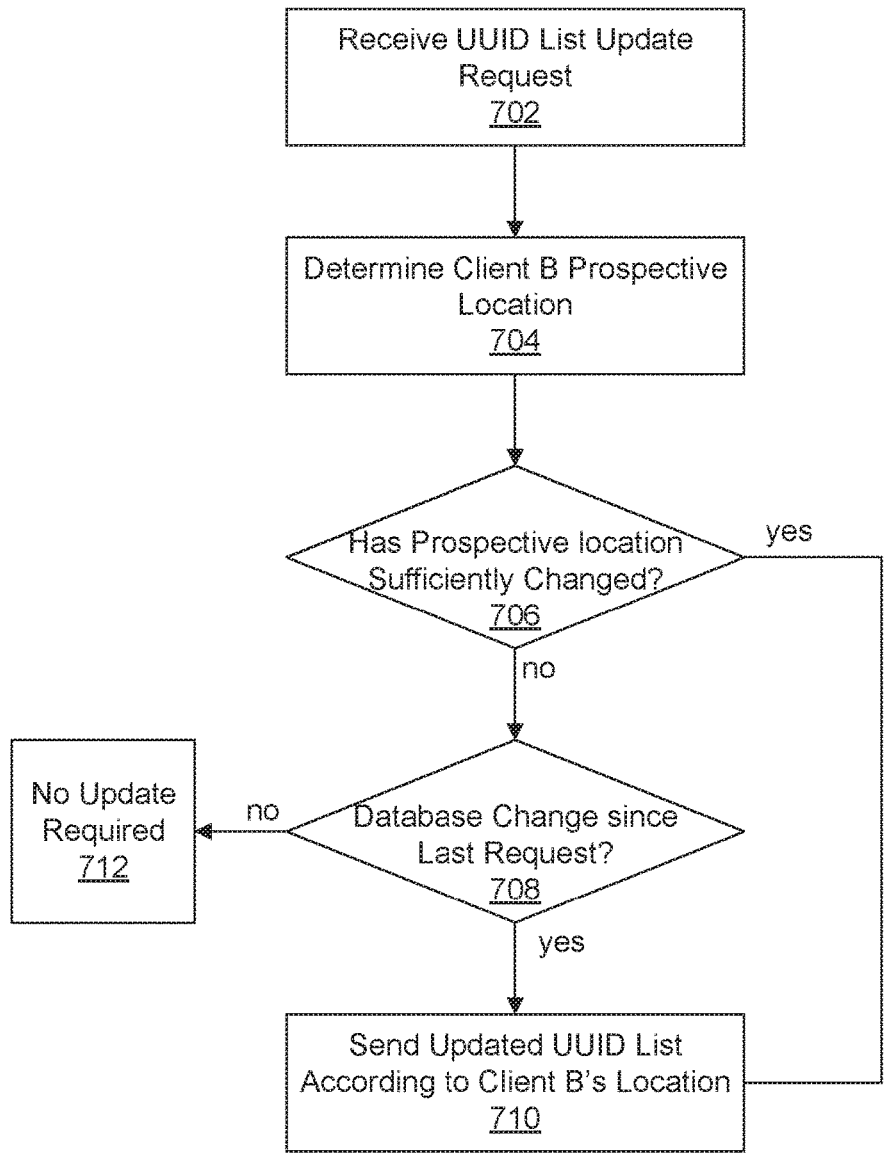
FIG. 7 is a flowchart illustrating the operations of the list maintenance program of FIG. 1, in accordance with an embodiment of the invention.

With reference to FIG. 7, this figure depicts a flowchart for an example embodiment of list maintenance program 112, which determines whether a received information about a UUID list 144 on second mobile device 140 is up-to-date, and, if necessary, sends relevant updates to the second mobile device.

Referring to step 702, list maintenance program 112 receives request for an update to the UUID list 144. The request may contain characteristics about the UUID list 144 such as, for example, the geographic boundaries of the list, the last time the list was updated, or any other relevant information. Additionally, the request may contain characteristics about the second mobile device 140 such as, for example, location of the device or prospective location of the device.

Referring to step 704, list maintenance program 112 determines the prospective location of the second mobile device. The prospective location of the device may be a determination of which geographic locations the prospective device is likely to be until the next update is scheduled to occur. The determination may use multiple factors to predict the prospective location such as, for example, the location/movement of the second mobile device 140 based on the time of day/day of the week, referencing a calendar located on the second mobile device 140 to determine where a user may need to be, receiving information from a map device directing a user to a specific location, or any other number of location prediction techniques.

Referring to step 706, list maintenance program 112 determines whether the location, or prospective location, of the second device 140 has sufficiently changed. The determination may be made in instances where the location, or prospective location, of the second device 140 does not encompass the same geographic area of the UUID list 144. If the location, or prospective location, has sufficiently changed list maintenance program 112 proceeds to step 710. If the location, or prospective location, has not sufficiently changed list maintenance program 112 proceeds to step 708.

Referring to step 708, list maintenance program 112 determines whether the UUID database 116 for the corresponding geographic area has changed since the last update. In an example embodiment, the time of the last update of the for each geographic region of the UUID list 144 is compared to metadata corresponding to the last update to each geographic region of the UUID database 116, and when the last update of the UUID database 116 is more recent than an update of the UUID list 144 is required. If the UUID database has changed since the last update, list maintenance program 112 proceeds to step 710. If the UUID database has not changed since the last update, list maintenance program 112 proceeds to step 712.

Referring to step 710, list maintenance program 112 sends updates for the UUID list 144, based on changes to the UUID database 116 and changes in prospective location. In one embodiment, the list maintenance program 112 may determine each UUID from the UUID database 116 that is not contained in the UUID list 144, and send only those UUIDs (and their respective information) to the second mobile device 140. In instances where a UUID list 144 update is required due to a change in geography, list maintenance program 112 only sends the UUIDs associated with the new geography, or prospective geography, of the second mobile device 140. In instances where a UUID list 144 update is required because of an update to the UUID database 116, list maintenance program 112 only sends the UUIDs that have added to the database in between the last update and the current time. Additionally, list maintenance program 112 may send a signal to remove the UUIDs that have removed from the database in between the last update and the current time, in order to minimize the memory allocated by the second mobile device 140.

Referring to step 712, list maintenance program 112 sends a notification to the second mobile device 140 that no update is required.

Figure 8:
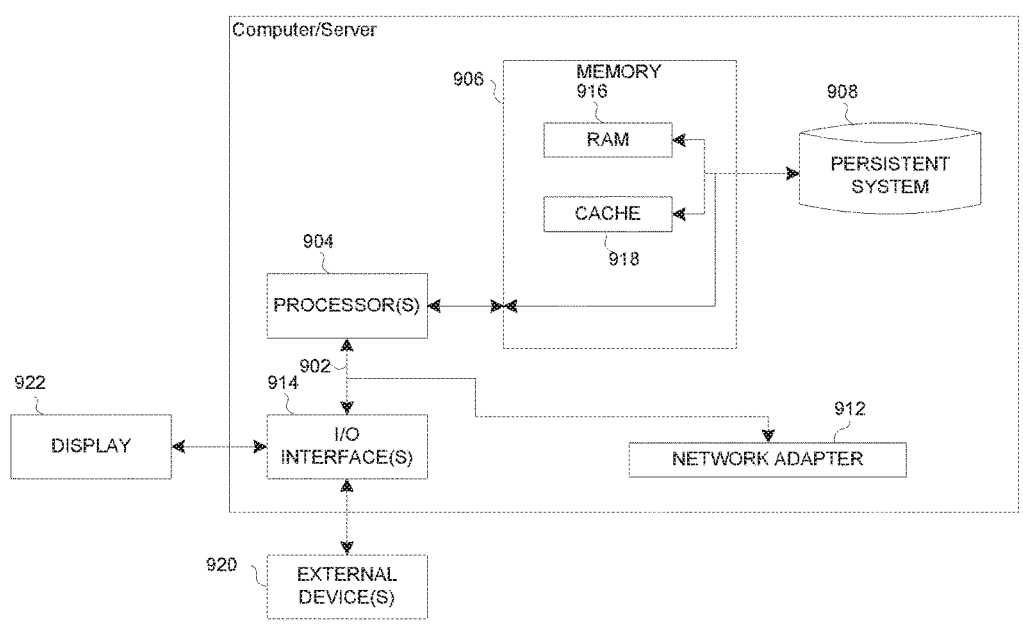
FIG. 8 is a block diagram depicting the hardware components of the beacon detection system of FIG. 1, in accordance with an embodiment of the invention.

FIG. 8 depicts a block diagram of components of computing device 110, first mobile device 130 and second mobile device 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110, first mobile device 130 and second mobile device 140 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs list maintenance program 112, beacon location program 116, and UUID database 116 in computing device 110; beacon program 132 in first mobile device 130; and beacon detection program 142, and UUID list 144 in second mobile device 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs list maintenance program 112, beacon location program 116, and UUID database 116 in computing device 110; beacon program 132 in first mobile device 130; and beacon detection program 142, and UUID list 144 in second mobile device 140 may be downloaded to persistent storage 908 through communications unit 912.

I/O interface(s) 914 allows for input and output of data with other devices that may be connected to computing device 110, first mobile device 130 and second mobile device 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., The programs list maintenance program 112, beacon location program 116, and UUID database 116 in computing device 110; beacon program 132 in first mobile device 130; and beacon detection program 142, and UUID list 144 in second mobile device 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for detecting a device, the method comprising:
   receiving, by a first device having data connectivity with a service provider, a list of Universally Unique Identifiers (UUIDs);
   determining, by the first device without data connectivity with a service provider, a Universally Unique Identifier (UUID)UUID of a beacon of a second device;
   determining a first location of the first device;
   determining, by the first device, whether the UUID of the beacon of the second device matches a UUID in a list of UUIDs, wherein each UUID in the list of UUIDs corresponds to a beacon associated with a device;
   based on determining the UUID of the beacon of the second device matches an entry in the list and determining connectivity with the service provider has been reestablished with the first device, transmitting, by the first device, the UUID of the beacon of the second device and the first location to a third device.

2. The method of claim 1, further comprising:
   determining, by the first device, an update to the UUID list is required, wherein the determining the update to the UUID list is required comprises one or more of:
   detecting a second location of the first device, and determining the second location is different from the first location; and
   determining a threshold time has been exceeded since;
   requesting, by the first device, an update to the UUID list.

3. The method of claim 2, further comprising:
   receiving, by the first device, the update to the UUID list, wherein the update to the UUID list only contains UUIDs corresponding to the second location; and
   adding, by the first device, each UUID contained in the update to the UUID list into the list of UUIDs.

4. The method of claim 2, further comprising:
   receiving, by the first device, the update to the UUID list, wherein the update to the UUID list contains UUIDs that are not relevant to the second location;
   removing, by the first device, each UUID contained in the update to the UUID list from the list of UUIDs.

5. The method of claim 1, further comprising
   receiving, by the first device, a wireless signal with a new UUID;
   determining, by the first device, the new UUID is not contained in the UUID list; and
   adding, by the first device, the new UUID to the UUID list.

6. The method of claim 1, wherein determining the UUID of the beacon of the second device further comprises:
   detecting, by the first device, a wireless signal;
   determining, by the first device, a wireless UUID associated with the wireless signal;
   determining, by the first device, a tag in the wireless UUID, wherein the tag corresponds to a portion of the wireless UUID; and
   determining, by the first device, the tag matches a beacon tag from a list of beacon tags, wherein the list of beacon tags is one or more tags corresponding to a beacon signal.

7. The method of claim 1, further comprising:
   wherein determining the first location of the first device further comprises determining a first signal strength of the second device;
   determining a second location of the first device and a second signal strength of the second device;
   determining a third location of the first device and a third signal strength of the second device;
   determining a location of the second device based on the first location of the first device, the second location of the first device, the third location of the first device, the first signal strength of the second device, the second signal strength of the second device, and the third signal strength of the second device; and
   transmitting the location of the second device to the third device.

* * * * *